(12) United States Patent
Ahmadi

(10) Patent No.: US 9,194,540 B1
(45) Date of Patent: Nov. 24, 2015

(54) LIGHTWEIGHT LIQUID RESERVOIR

(76) Inventor: William Ahmadi, Los Angeles, CA (US)

( * ) Notice: Subject to any disclaimer, the term of this patent is extended or adjusted under 35 U.S.C. 154(b) by 835 days.

(21) Appl. No.: 13/385,932

(22) Filed: Mar. 15, 2012

(51) Int. Cl.
 *F17C 13/00* (2006.01)
 *F17C 13/08* (2006.01)

(52) U.S. Cl.
 CPC .............. *F17C 13/00* (2013.01); *F17C 13/08* (2013.01); *F17C 2203/06* (2013.01); *F17C 2203/0602* (2013.01); *F17C 2203/0626* (2013.01); *F17C 2205/0157* (2013.01); *F17C 2205/0165* (2013.01); *F17C 2205/0169* (2013.01)

(58) Field of Classification Search
 CPC .............. F17C 2203/0626; F17C 2203/0629; F17C 2203/0631; F17C 2203/0673; F17C 2203/0678; F17C 2203/0602; F17C 2203/06; F17C 2205/0157; F17C 2205/0165; F17C 2205/0169; F17C 13/00; F17C 13/08
 USPC ............... 137/357, 363; 220/565, 567, 567.1, 220/4.26, 4.01, 62.15, 605, 647, 668, 902
 See application file for complete search history.

(56) References Cited

U.S. PATENT DOCUMENTS

| | | | | |
|---|---|---|---|---|
| 1,460,613 A * | 7/1923 | Sill | ............................. | 137/357 |
| 3,562,977 A * | 2/1971 | Alleaume | ........................ | 52/82 |
| 3,990,600 A * | 11/1976 | Rossitto et al. | ............... | 220/565 |
| 4,161,186 A * | 7/1979 | Sitarz | ............................. | 137/357 |
| 4,180,951 A * | 1/1980 | Francioni | ........................ | 52/100 |
| 4,513,550 A * | 4/1985 | Kotcharian | ................. | 52/745.01 |
| 4,520,051 A * | 5/1985 | Harrison | ........................ | 427/387 |
| 4,578,921 A * | 4/1986 | Cazaly et al. | ............... | 52/745.01 |
| 4,810,748 A * | 3/1989 | Spells | ............................ | 524/725 |
| 4,815,494 A * | 3/1989 | Raikamo | ....................... | 137/593 |
| 4,934,404 A * | 6/1990 | DeStefano | .................... | 137/357 |
| 4,963,082 A * | 10/1990 | Lindquist et al. | .............. | 425/117 |
| 5,046,529 A * | 9/1991 | Corella | ........................ | 137/590.5 |
| 5,234,286 A * | 8/1993 | Wagner | ......................... | 137/357 |
| 5,239,794 A * | 8/1993 | Klein | ............................ | 52/169.6 |
| 5,282,546 A * | 2/1994 | Bauer | ............................ | 220/565 |
| 5,730,179 A * | 3/1998 | Taylor | .......................... | 137/357 |
| 6,230,451 B1* | 5/2001 | Stoller | ......................... | 52/169.1 |
| 6,526,699 B1* | 3/2003 | Foglio, Sr. | .................... | 137/357 |
| 6,547,488 B2* | 4/2003 | Imbrigiotta | ..................... | 405/36 |
| 6,796,325 B1* | 9/2004 | Courier | ........................ | 137/357 |
| 6,818,127 B1* | 11/2004 | Ketrow | ..................... | 210/170.03 |
| 6,941,702 B1* | 9/2005 | Abrams et al. | ................ | 137/357 |
| 7,066,197 B1* | 6/2006 | Gray et al. | .................... | 137/357 |
| 7,207,748 B1* | 4/2007 | Urban | ........................... | 137/357 |
| 2004/0040598 A1* | 3/2004 | Zimmerman et al. | ........ | 137/357 |
| 2008/0128030 A1* | 6/2008 | Lewis | ........................... | 137/357 |
| 2010/0037962 A1* | 2/2010 | Ryan et al. | .................... | 137/357 |
| 2010/0206397 A1* | 8/2010 | Hewitt | .......................... | 137/357 |
| 2011/0023357 A1* | 2/2011 | Ahmadi | ......................... | 47/65.7 |
| 2011/0290341 A1* | 12/2011 | Lame et al. | ................... | 137/357 |

* cited by examiner

*Primary Examiner* — Craig Schneider
*Assistant Examiner* — Josephine Trinidad-Borges

(57) ABSTRACT

A transportable insulated water collection and storage apparatus that includes a reservoir deimitable by arrangement of a plurality of insulated, impermeable, lightweight panels, each of said panels having a foam core and a ceramic exterior adhered to the foam core by engagment around a mesh overlay disposed surficially upon said foam core, wherein runoff collected over a particular catchment is drainable through an inflow into the reservoir for storage and subsequent usage, as desired, a pump member forcibly drains water through an outflow when activated, and a cover member supportively maintains vegetative cover thereon conjunct a maximum water level, whereby rainwater and runoff is collectable and conveniently storable in a reservoir readily erectable and transportable, and thereby customizeable to a particular landscape, as desired, for subsequent use.

15 Claims, 5 Drawing Sheets

LIGHTWEIGHT LIQUID RESERVOIR

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

TO ALL WHOM IT MAY CONCERN

Be it known that I, William Ahmadi, a citizen of the United States, have invented new and useful improvements in a transportable insulated water collection and storage apparatus as described in this specification.

BACKGROUND OF THE INVENTION

Various types of reservoirs, water storage devices, and stormwater management systems and practices are known in the prior art. Most are permanent bodies comprising natural impermeable linings, whereby use of artificial, synthetic, and manmade foams is generally restricted in conjunction with domestic supplies, such as water tanks and tubs. What is needed is a transportable insulated water collection and storage apparatus, however, that includes a reservoir deimitable by arrangement of a plurality of insulated, impermeable, lightweight panels, each of said panels having a foam core and a ceramic exterior adhered to the foam core by engagment around a mesh overlay disposed surficially upon said foam core, wherein runoff collected over a particular catchment is drainable through an inflow into the reservoir for storage and subsequent usage, as desired, and a pump member forcibly drains water through an outflow when activated, whereby rainwater and runoff is collectable and conveniently storable in a reservoir readily erectable and transportable, and thereby customizeable to a particular landscape, as desired, for subsequent use.

FIELD OF THE INVENTION

The present invention relates to a transportable insulated water collection and storage apparatus, and more particularly, to a transportable insulated water collection and storage apparatus that includes a reservoir deimitable by arrangement of a plurality of insulated, impermeable, lightweight panels, each of said panels having a foam core and a ceramic exterior adhered to the foam core by engagment around a mesh overlay disposed surficially upon said foam core, wherein runoff collected over a particular catchment is drainable through an inflow into the reservoir for storage and subsequent usage, as desired, a pump member forcibly drains water through an outflow when activated, and a cover member controls evaporation from the reservoir, whereby rainwater and runoff is collectable and conveniently storable in a reservoir readily erectable and transportable, and thereby customizeable to a particular landscape, as desired, for subsequent use.

SUMMARY OF THE INVENTION

The general purpose of the transportable insulated water collection and storage apparatus, described subsequently in greater detail, is to provide a transportable insulated water collection and storage apparatus which has many novel features that result in a transportable insulated water collection and storage apparatus which is not anticipated, rendered obvious, suggested, or even implied by prior art, either alone or in combination thereof.

Water scarcity is a growing concern. Means of collecting rainwater and runoff for storage and directed usage are desirable. The present transportable insulated water collection and storage apparatus, therefore, has been devised to enable an expediently erectable reservoir erectable in location desirable for collection of water drainable therein. Further, the present transportable insulated water collection and storage apparatus comprises lightweight panels erectable in a desired arrangement to delimit the reservoir to a desirable extent to collect and store a desired water storage volume.

The term "lightweight", as used herein throughout, is contemplated to mean having a relatively low density whereby each panel is manually portable. Panel low density is effective due to a polymeric foam core, whereby a plurality of voids interspersed throughout a solidified foam enable inclusion of air within the volume of said foam core.

The present transportable insulated water collection and storage apparatus, therefore, includes a reservoir delimited by a plurality of panels erectable into desired arrangements to define a reservoir of desired extent. Each of the plurality of panels includes an insulating, impermeable polymeric foam core to which a ceramic exterior is set. The ceramic exterior is settable to a mesh overlay, said mesh overlay securable to the foam core by engagement of a wirelike web to a wire truss secured to the foam core by action of a plurality of C-rings. Thus the wirelike web enables points of purchase integrated through the ceramic exterior, said ceramic exterior thus setting upon and around the wirelike web to maintain suffuse exterior positioning overlying the foam core. A sealant is thence applied exteriorly to the ceramic exterior to control erosion and decrease permeability of the ceramic exterior.

It should be readily ascertained that the term "ceramic", as used herein throughout, is taken to include any clay-based or silica-oxide or alumina-oxide-based spreadable compound which is subsequently settable when exposed to heat or ambient atmosphere by drying action, dehydration, or chemical alteration such as is effected by carbonation of non-hydraulic cement, for example. Thus the term "ceramic", as used herein throughout, is taken to include clay, ceramics, concrete, cement, and other compounds spreadable upon a foam core for settable engagement with a mesh overlay, in the manner herein described.

An inflow is disposed upon the reservoir in drainage of a catchment, whereby water runoff from collection over said catchment is drainable into the reservoir for storage and subsequent use, as desired. An overflow drain is included to prevent a water storage volume from exceeding a maximum water level whereby a maximum capacity of the reservoir is controllable. The catchment is contemplated as an area of ground surface having a common drainage, and may include manmade and artificial surfaces such as, for example, roofs, roadways, and other impervious coverings.

An outflow is disposed upon the reservoir whereby water storage volume is directable from the reservoir for desired use. The outflow is disposed in operational communication with a pump member, whereby water is forcible from the reservoir when the pump member is activated. The pump member is contemplated to be an electrically powered pump member, disposed in circuit with a photovoltaic array and, alternately, a wind turbine, whereby renewable sources of power enable use of the pump member absent available grid capacity.

A plurality of bracket members are included in the present invention for assemblage of a reservoir above a ground level, whereby the plurality of panels are securable in connected situation to withstand the pressure of the maximum water storage volume. Thus above ground embodiments of the present transportable insulated water collection and storage apparatus are contemplated for use, as desired.

A cover member is disposed to partially cover or enclose the present reservoir, whereby evaporation of the water storage volume is controllable. The cover member includes at least one recessed area wherein vegetative cover is maintainable. The recessed area may be disposed to contact, or proximally contact a water surface of water stored interior to the reservoir when at, or proximal, the maximum capacity, whereby vegetative cover maintained within said recessed area is enabled access to said water storage volume.

The present transportable insulated water collection and storage apparatus, therefore, enables expedient erection of a reservoir delimitable between a plurality of impermeable and insulated panels, each of said panels dispositional into an arrangement appropriate for defining a desired water storage volume with respect to a particular catchment, whereby expedient collection and storage of rainwater and runoff is effective proximal the home, or elsewhere, as desired.

Thus has been broadly outlined the more important features of the present transportable insulated water collection and storage apparatus so that the detailed description thereof that follows may be better understood and in order that the present contribution to the art may be better appreciated.

Objects of the present transportable insulated water collection and storage apparatus, along with various novel features that characterize the invention are particularly pointed out in the claims forming a part of this disclosure. For better understanding of the transportable insulated water collection and storage apparatus, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
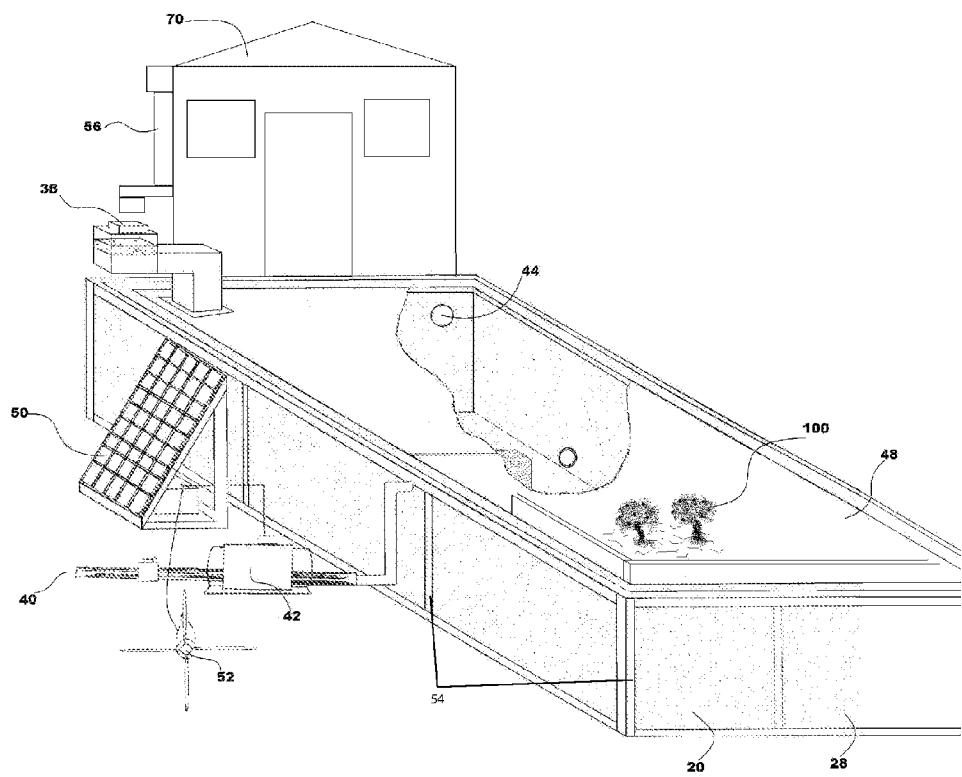
FIG. 1 is an isometric view of an example embodiment illustrating an above ground reservoir in drainage with a catchment, said catchment the impervious cover of a roof.
Figure 2:
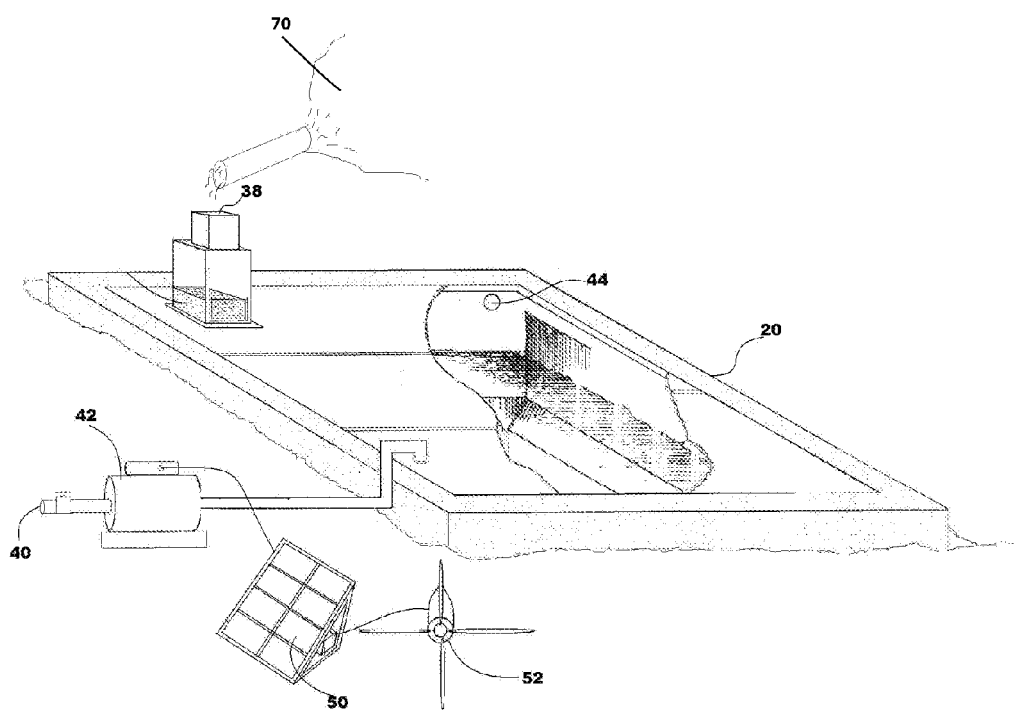
FIG. 2 is an isometric view of an example embodiment illustrating an in ground reservoir in drainage with a catchment, said catchment a sloped area of land.
Figure 3:
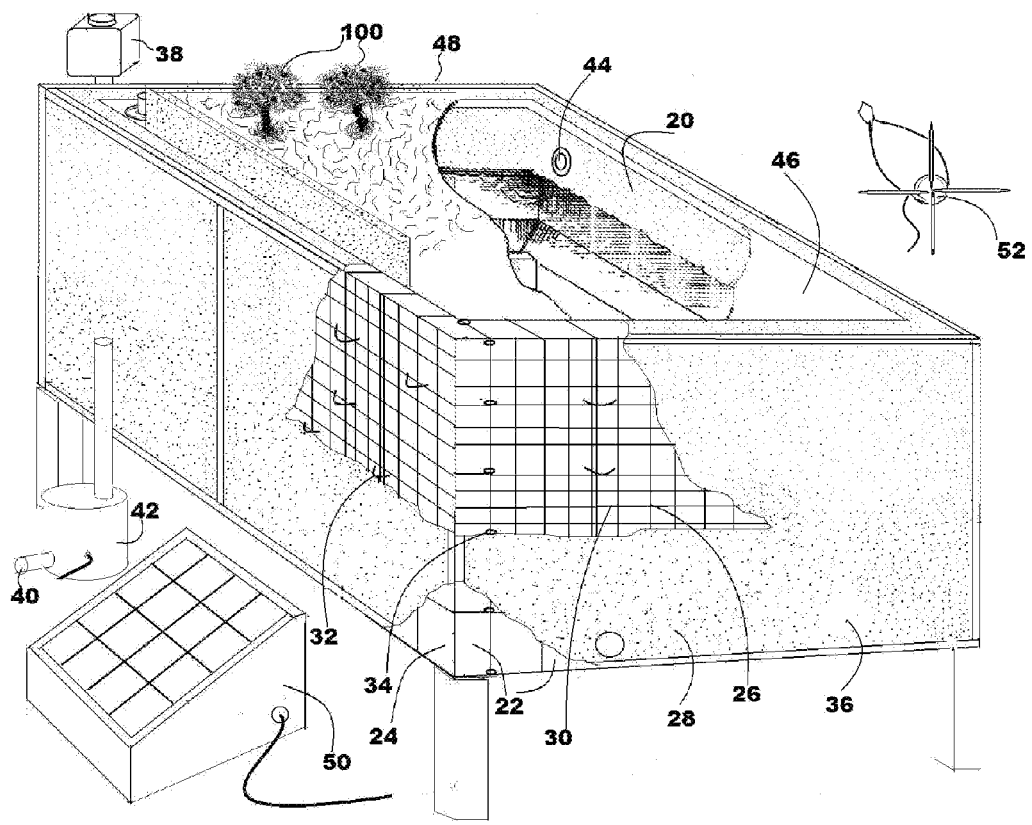
FIG. 3 is an isometric view of an example embodiment illustrating an above ground reservoir with partial cutaway sections of a ceramic exterior whereby a foam core of each of a plurality of panels is rendered visible.
Figure 4:
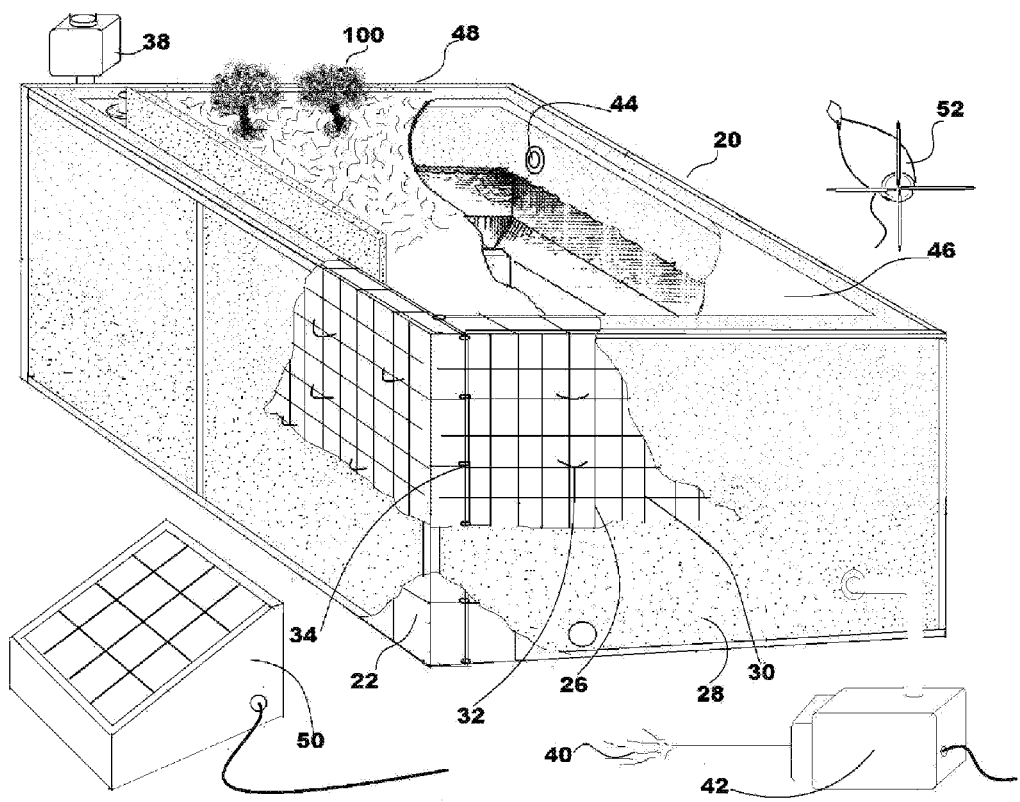
FIG. 4 is an isometric view of an example embodiment illustrating an above ground reservoir raised above a ground surface.
Figure 5:
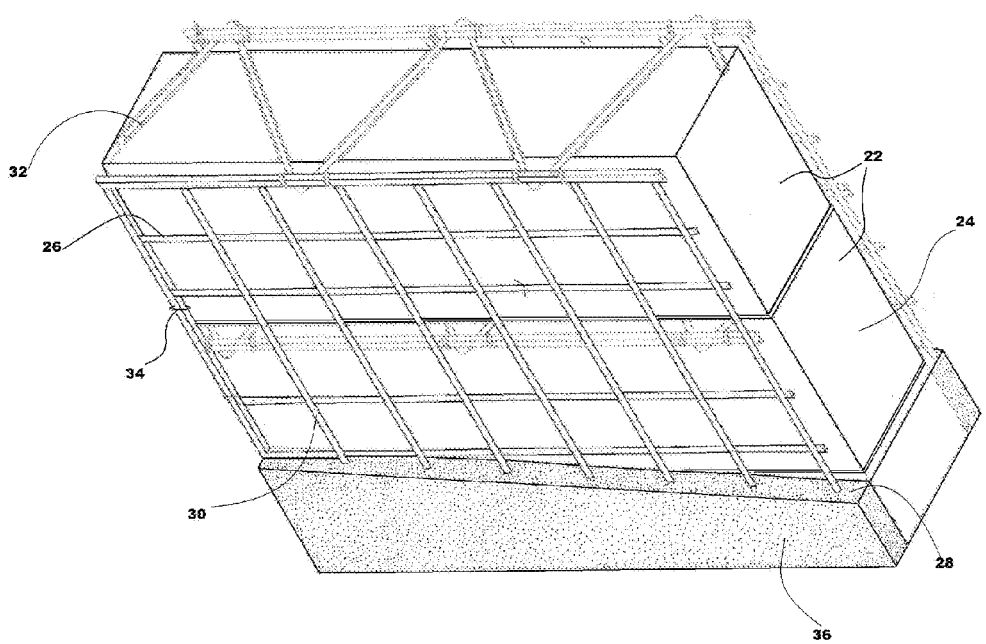
FIG. 5 is a detail view of an example embodiment of a plurality of panels, each of said panels having a foam core, a mesh overlay having a wirelike web and a wire truss to which a ceramic exterior is set.

With reference now to the drawings, and in particular FIGS. 1 through 5 thereof, example of the instant transportable insulated water collection and storage apparatus employing the principles and concepts of the present transportable insulated water collection and storage apparatus and generally designated by the reference number 10 will be described.

Referring to FIGS. 1 through 5 a preferred embodiment of the present transportable insulated water collection and storage apparatus 10 is illustrated.

The present transportable insulated water collection and storage apparatus 10 has been devised to enable lightweight location and relocation of a reservoir positional in drainage of a catchment whereby rainwater and runoff is collectable and storable for subsequent, directed use.

The present transportable insulated water collection and storage apparatus 10, therefore, includes a reservoir 20 delimited by an erectable plurality of panels 22, said plurality of panels 22 constructible into a desired arrangement to define the reservoir 20 volume. Each of the plurality of panels 22 includes a polymeric foam core 24, a mesh overlay 26 disposed surficially upon said foam core 24, and an impermeable, suffuse ceramic exterior 28 disposed set to the mesh overlay 26.

The term "polymeric", as used herein throughout, is taken to include polystyrene, polyurethane, polypropylene, ethylene vinyl acetate, polyethylene, or other organic or aliphatic carbonaceous compound dispositional as an impermeable and thermally insulating solidified foam. The term "ceramic", as used herein, is taken to include any clay- or alumina oxide-based, spreadable, settable compound, including clays, concrete, and cement.

In an example embodiment herein illustrated, the mesh overlay 26 includes a wirelike web 30 disposed securable to a wire truss 32, said wire truss 32 securable to said foam core 24 by action of a plurality of C-rings 34 and the ceramic exterior is layered to a minimum thickness of at least 2.22 cm. The ceramic exterior 28 may include an exteriorly disposed sealant 36 preventative of erosion.

An inflow 38 is disposed in drainage from a catchment 70 whereby runoff or collected rainwater is drainable into the reservoir 20 for storage. An outflow 40 is likewise disposed upon the reservoir 20 wherethrough water storage volume is forcible, by action of a pump member 42 disposed to force water through said outflow 40 when said pump member 42 is activated, for directed use, as desired.

An overflow drain 44 is included disposed to drain water storage volume exceeding a maximum water level from the reservoir 20, whereby fill of the reservoir 20 beyond a maximum capacity is preventable.

A cover member 46 is included whereby partial covering or enclosure of the reservoir 20 is enabled to control evaporation of water storage volume. The cover member 46 includes at least one recessed area 48 supportable of vegetative cover 100 therein, whereby a garden or other vegetative cover is maintainable. The recessed area 48 may be disposed to contact water storage volume at a water level proximal the maximum water level.

In an example embodiment herein disclosed, the pump member 42 is disposed in operational communication with at least one photovoltaic array 50 whereby powering of the pump member 42 is effective by solar energy. The pump member 42 may likewise be disposed in operational communication with at least one wind turbine 52. Each of said photovoltaic array 50 and wind turbine 52 may further be disposed in circuit with at least one battery, whereby continual use of the pump member 42 is enabled appropriate to remaining charge of said at least one battery.

The present transportable insulated water collection and storage apparatus 10 is further contemplated for aboveground usage. The reservoir 20 is thereby supportable above an underlying ground surface by a plurality of bracket members 54 disposed engaged against each of the plurality of panels 22, whereby a ground level recession is not needed to support and contain said panels 22 to delimit the reservoir 20 volume. Each of the plurality of bracket members 54 is positional to uphold position of each of the plurality of panels 22 engaged in watertight array to prevent leakage and support the water storage volume storable interior to the reservoir 20. Additionally, said plurality of bracket members 54 enables support of the cover member 46 with vegetative cover thereon.

When articulated for above ground level usage, the inflow 38 includes at least one gutter member 56 disposed to route water collectable at the catchment 70 into the reservoir 20, as may be practicable dictated by the particular site to which the present transportable insulated water collection and storage apparatus 10 is installed.

What is claimed is:

1. A transportable insulated water collection and storage apparatus comprising:
   a reservoir delimited by a plurality of panels, said plurality of panels constructible into a desired arrangement, each of said panels comprising:
   a polymeric foam core;
   a mesh overlay disposed and secured surficially upon said foam core by a C-ring fastener;
   an impermeable, suffuse ceramic exterior disposed set to the mesh overlay;
   an inflow drainable from a catchment;
   an outflow;
   an overflow drain; and
   a cover member dispositionally enclosing the reservoir;
   wherein water collection upon the catchment is routable and storable insulated inside the reservoir and forcible therefrom for use when desired.

2. The transportable insulated water collection and storage apparatus of claim 1 wherein the mesh overlay includes a wirelike web securable to a wire truss, said wire truss having a minimum gauge of at least 3.4 mm diameter spaced at at least 15 cm intervals upon each foam core.

3. The transportable insulated water collection and storage apparatus of claim 2 wherein the ceramic exterior is layered to a thickness of at least 2.22 cm exteriorly coating each panel.

4. The transportable insulated water collection and storage apparatus of claim 3 wherein the reservoir is supportable above an underlying ground surface by bracket members disposed engaged against each of the plurality of panels.

5. The transportable insulated water collection and storage apparatus of claim 4 wherein the inflow includes at least one gutter member disposed to route water collectable at the catchment into the reservoir.

6. The transportable insulated water collection and storage apparatus of claim 5 further comprising a pump member disposed to force water through the outflow when said pump member is activated.

7. The transportable insulated water collection and storage apparatus of claim 6 wherein the ceramic exterior includes a sealant disposed surficially thereon whereby erosion and weathering of said ceramic exterior is preventable.

8. The transportable insulated water collection and storage apparatus of claim 7 wherein the cover member includes a recessed surface, to which recessed surface may be added for supportively upholding and maintaining vegetative cover therein.

9. The transportable insulated water collection and storage apparatus of claim 7 wherein the pump member is disposed in operational communication with at least one photovoltaic array.

10. The transportable insulated water collection and storage apparatus of claim 7 wherein the pump member is disposed in operational communication with at least one wind turbine.

11. A transportable insulated water collection and storage apparatus for the collection and storage of rainwater and runoff, said transportable insulated water collection and storage apparatus comprising:
    a reservoir delimited by an erectable plurality of panels, said plurality of panels constructible into a desired arrangement to define the reservoir volume, each of said plurality of panels comprising:
    a polymeric foam core comprising polystyrene, polyurethane, polypropylene, ethylene vinyl acetate, or polyethylene;
    a mesh overlay disposed surficially upon said foam core, said mesh overlay having a wirelike web disposed securable to a wire truss securable to said foam core by action of a plurality of C-rings;
    an impermeable, suffuse ceramic exterior disposed set to the mesh overlay, said ceramic exterior layered to a minimum thickness of at least 2.22 cm, said ceramic exterior including an exteriorly disposed sealant preventative of erosion;
    an inflow drainable from a catchment;
    an outflow;
    a pump member disposed to force water through said outflow when said pump member is activated;
    an overflow drain; and
    a cover member dispositionally enclosing the reservoir, said cover member including at least one recessed area supportable of vegetative cover therein;
    wherein water collection upon the catchment is routable and storable insulated inside the reservoir and forcible therefrom for use when desired.

12. The transportable insulated water collection and storage apparatus of claim 11 wherein the pump member is disposed in operational communication with at least one photovoltaic array.

13. The transportable insulated water collection and storage apparatus of claim 11 wherein the pump member is disposed in operational communication with at least one wind turbine.

14. The transportable insulated water collection and storage apparatus of claim 11 wherein the reservoir is supportable above an underlying ground surface by bracket members disposed engaged against each of the plurality of panels.

15. The transportable insulated water collection and storage apparatus of claim 14 wherein the inflow includes at least one gutter member disposed to route water collectable at the catchment into the reservoir.

* * * * *